(12) United States Patent
Bhandari et al.

(10) Patent No.: US 11,922,129 B2
(45) Date of Patent: Mar. 5, 2024

(54) CAUSAL KNOWLEDGE IDENTIFICATION AND EXTRACTION

(71) Applicant: International Business Machines Corporation, Armonk, NY (US)

(72) Inventors: Manik Bhandari, Pittsburgh, PA (US); Oktie Hassanzadeh, Briarcliff Manor, NY (US); Mark David Feblowitz, Winchester, MA (US); Kavitha Srinivas, Port Chester, NY (US); Shirin Sohrabi Araghi, Briarcliff manor, NY (US)

(73) Assignee: International Business Machines Corporation, Armonk, NY (US)

( * ) Notice: Subject to any disclaimer, the term of this patent is extended or adjusted under 35 U.S.C. 154(b) by 447 days.

(21) Appl. No.: 17/354,171

(22) Filed: Jun. 22, 2021

(65) Prior Publication Data

US 2022/0405487 A1 Dec. 22, 2022

(51) Int. Cl.
*G06F 7/00* (2006.01)
*G06F 40/40* (2020.01)
(Continued)

(52) U.S. Cl.
CPC .............. *G06F 40/40* (2020.01); *G06N 5/04* (2013.01); *G06N 20/00* (2019.01)

(58) Field of Classification Search
CPC .............. G06F 16/3329; G06F 16/335; G06F 16/90332; G06F 16/3337; G06F 16/243;
(Continued)

(56) References Cited

U.S. PATENT DOCUMENTS 10,275,454 B2 * 4/2019 Chowdhury ............ G06F 40/30
10,528,669 B2 1/2020 Chatterjee
(Continued)

FOREIGN PATENT DOCUMENTS

CN 109783618 A 5/2019
CN 110162636 A 8/2019
(Continued)

OTHER PUBLICATIONS

Dunietz, J. et al., "The BECauSE Corpus 2.0: Annotating Causality and Overlapping Relations", Proceedings of the 11th Linguistic Annotation Workshop, Association for Computational Linguistics, pp. 95-104 (2017).
(Continued)

*Primary Examiner* — Mohammad A Sana
(74) *Attorney, Agent, or Firm* — Mark Bergner

(57) ABSTRACT

A computer-implemented method is provided that includes accessing candidate text and a candidate pair including first and second phrases, substituting the first and second phrases into cause-effect patterns to generate variant sentences. An artificial intelligence model is leveraged to determine respective probabilities that the variant sentences are inferred from the candidate text, calculate a statistical measure of the respective probabilities, and assess the calculated statistical measure to ascertain whether the first and second phrases possess a causal relationship or non-causal relationship to one another. A knowledge base including one or more pairs of cause-effect phrase pairs is populated with the first and second phrases possessing the causal relationship. A computer system and a computer program product are also provided.

25 Claims, 11 Drawing Sheets

(51) Int. Cl.
*G06N 5/04* (2023.01)
*G06N 20/00* (2019.01)
(58) Field of Classification Search
CPC ........ G06F 40/40; G06F 40/211; G06F 40/47;
G06F 40/44; G06F 40/30; G06F 40/56;
G06F 40/247; G06F 40/279; G06F
40/205; G06N 20/00; G06N 5/04
See application file for complete search history.

(56) References Cited

U.S. PATENT DOCUMENTS

| | | | |
|---|---|---|---|
| 2018/0082681 A1* | 3/2018 | Fujiwara | G06F 40/45 |
| 2018/0336183 A1* | 11/2018 | Lee | G06N 5/022 |
| 2020/0074013 A1* | 3/2020 | Chen | G06F 40/30 |
| 2020/0401910 A1 | 12/2020 | Hassanzadeh | |

FOREIGN PATENT DOCUMENTS

| | | |
|---|---|---|
| CN | 110704890 A | 1/2020 |
| CN | 111552609 A | 8/2020 |
| CN | 111709225 A | 9/2020 |
| CN | 111767408 A | 10/2020 |
| JP | 2023002475 A | 1/2023 |

OTHER PUBLICATIONS

Fleiss, Joseph L., "Measuring Nominal Scale Agreement Among Many Raters", Psychological Bulletin, vol. 76, No. 5, pp. 378-382 (1971).

Handler, A., et al., "Bag of What? Simple Noun Phrase Extraction for Text Analysis", Proceedings of 2016 EMNLP Workshop on Natural Language Processing and Computational Social Science, pp. 114-124 (2016).

Hassanzadeh, O., et al., "Answering Binary Causal Questions Through Large-Scale Text Mining: An Evaluation Using Cause-Effect Pairs from Human Experts", Proceedings of the Twenty-Eighth International Joint Conference on Artificial Intelligence (IJCAI), pp. 5003-5009 (2019).

Hassanzadeh, O., et al., "Causal Knowledge Extraction through Large-Scale Text Mining", The Thirty-Fourth AAAI Conference on Artificial Intelligence (AAAI-20), pp. 13610-13611 (2020).

Hendrickx, I., et al., "SemEval-2010 Task 8: Multi-Way Classification of Semantic Relations Between Pairs of Nominals", Proceedings of the 5th International Workshop on Semantic Evaluation, pp. 33-38 (2010).

Radinsky, K., et al., "Learning Causality for News Events Prediction", International World Wide Web Conference Committee, pp. 909-918 (2012).

Sharp, R., et al., "Creating Causal Embeddings for Question Answering with Minimal Supervision", Proceedings of the 2016 Conference on Empirical Methods in Natural Language Processing, pp. 138-148 (2016).

Sohrabi, S., et al., "IBM Scenario Planning Advisor: Plan Recognition as AI Planning in Practice", Proceedings of the 27th International Joint Conference on Artificial Intelligence (IJCAI'18), pp. 5865-5867 (2018).

Dasgupta et al., "Automatic Extraction of Causal Relations from Text using Linguistically Informed Deep Neural Networks", Proceedings of the SIGDIAL 2018 Conference, pp. 306-316, Melbourne, Australia, Jul. 12-14, 2018.

Dunietz et al., "Automatically Tagging Constructions of Causation and Their Slot-Fillers", Transactions of the Association for Computational Linguistics, vol. 5, pp. 117-133, 2017, Action Editor: Christopher Potts, Submission batch: Sep. 2016; Revision batch: Nov. 2016; Published Jun. 2017.

Hashimoto et al., "Toward Future Scenario Generation: Extracting Event Causality Exploiting Semantic Relation, Context, and Association Features", Proceedings of the 52nd Annual Meeting of the Association for Computational Linguistics, pp. 987-997, Baltimore, Maryland, USA, Jun. 23-25, 2014.

Kruengkrai et al., "Improving Event Causality Recognition with Multiple Background Knowledge Sources Using Multi-Column Convolutional Neural Networks", Proceedings of the Thirty-First AAAI Conference on Artificial Intelligence (AAAI-17), 2017, pp. 3466-3473.

Li et al., "Downstream Model Design of Pre-trained Language Model for Relation Extraction Task", arXiv:2004.03786v1 [cs.CL] Apr. 8, 2020, 15 pages.

Li et al., "Guided Generation of Cause and Effect", Proceedings of the Twenty-Ninth International Joint Conference on Artificial Intelligence (IJCAI-20), 2020, pp. 3629-3636.

Luo et al., "Commonsense Causal Reasoning between Short Texts", Proceedings, Fifteenth International Conference on Principals of Knowledge Representation and Reasoning (KR 2016), 2016, pp. 421-430.

Radinski et al., "Learning to Predict from Textual Data", Journal of Artificial Intelligence Research 45 (2012) pp. 641-684, Submitted Nov. 2012; published Dec. 2012

Sap et al., "ATOMIC: An Atlas of Machine Commonsense for If-Then Reasoning", arXiv:1811.00146v3 [cs.CL] Feb. 7, 2019, 9 pages.

Soares et al., "Matching the Blanks: Distributional Similarity for Relation Learning", Proceedings of the 57th Annual Meeting of the Association for Computational Linguistics, pp. 2895-2905, Florence, Italy, Jul. 28-Aug. 2, 2019.

* cited by examiner

CAUSAL KNOWLEDGE IDENTIFICATION AND EXTRACTION

BACKGROUND

The present embodiments relate to a system, a computer program product, and a computer-implemented method for leveraging of an artificial intelligence (AI) model to identify cause-effect pairs and/or extract causal knowledge from a corpus, particularly in an unsupervised or substantially unsupervised manner.

The development of databases containing a high-quality collection of cause-effect pairs has many potential benefits and applications. Such collection can be further processed for various ends, can be represented as a causal knowledge graph, and can be used as input for decision support or predictive analytics, particularly in AI systems. Assembling collections of cause-effect pairs involves extracting causal knowledge from natural language descriptions of such knowledge in text documents and corpuses. Such extraction presents a challenging problem with a wide range of application in AI systems. A major problem in applying state-of-the-art supervised knowledge extraction methods is the need for a large manually annotated corpus. The manual annotation of corpuses is not feasible for large-scale generic causal knowledge extraction.

It would be a significant advancement in the technological error to develop a system, a computer program product, and a computer-implemented method that can output a high-quality collection of cause-effect pairs. In particularly exemplary embodiments, the system, computer program product, and computer-implemented method are operable in a substantially or completely unsupervised manner.

SUMMARY

The embodiments include a system, a computer program product, and a method for leveraging of an artificial intelligence (AI) model to extracting causal knowledge from a corpus and/or identifying cause-effect pairs. This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

In one aspect, a computer system is provided with a processor operatively coupled to memory, and an artificial intelligence (AI) platform in communication with the processor and the memory. The AI platform includes a sentence assembler, an AI model, and a director. The sentence assembler is configured to access candidate text and a candidate pair of first and second phrases, and to substitute the first and second phrases of the candidate pair into a plurality of cause-effect patterns to generate a plurality of variant sentences including the first and second phases. The AI model is configured to determine respective probabilities that the variant sentences are inferred from the candidate text, calculate a statistical measure of the respective probabilities, and assess the calculated statistical measure to ascertain whether the first and second phrases possess a causal relationship or non-causal relationship to one another. The director is configured to populate a knowledge base with the candidate text including the first and second phrases possessing the causal relationship.

In another aspect, a computer system is provided with a processor operatively coupled to memory, and an artificial intelligence (AI) platform in communication with the processor and the memory. The AI platform includes a natural language processing (NLP) model, an AI model, and a director. The NLP model is configured to generate a natural language (NL) question using a first phrase representing a cause or an effect. The AI model is configured to extract one or more candidate second phrases from candidate text, determine respective probabilities that the one or more candidate second phrases answer the NL question, and selected the candidate second phrase having the highest probabilities as possessing a causal relationship with the first phrase. The director is configured to populate a knowledge base with the first and selected second phrases.

In still another aspect, a computer program product is provided. The computer program product includes a computer readable storage medium having program code embodied therewith. The program code is executable by a processor to access candidate text, extract a candidate pair of first and second phrases from the candidate text, and substitute the first and second phrases of the candidate pair into a plurality of cause-effect patterns to generate a plurality of variant sentences including the first and second phrases. The program code is further executable by the processor to determine respective probabilities that the variant sentences are inferred from the candidate text, calculate a statistical measure of the respective probabilities, assess the calculated statistical measure to ascertain whether the first and second phrases possess a causal relationship or non-causal relationship to one another, and populate a knowledge base with the candidate text including the first and second phrases possessing the causal relationship.

In a further aspect, a computer-implemented method is provided. Candidate text and a candidate pair of first and second phrases are accessed. The first and second phrases are substituted into a plurality of cause-effect patterns to generate a plurality of variant sentences including the first and second phrases. An artificial intelligence model is leveraged to determine respective probabilities that the variant sentences are inferred from the candidate text, calculate a statistical measure of the respective probabilities, and assess the calculated statistical measure to ascertain whether the first and second phrases possess a causal relationship or non-causal relationship to one another. A knowledge base is populated with the candidate text including the first and second phrases possessing the causal relationship.

In a still further aspect, a computer-implemented method is provided. A natural language processing model is used to generate a natural language (NL) question using a first phrase representing a cause or effect. An artificial intelligence (AI) model is leveraged. The leveraging of the AI model includes extracting one or more candidate second phrases from candidate text, determining respective probabilities that the one or more candidate second phrases answer the NL question, and selecting the candidate second phrase having the highest probability as possessing a causal relationship with the first phrase. A knowledge base is populated with the first and selected second phrases.

These and other features and advantages will become apparent from the following detailed description of the exemplary embodiment(s), taken in conjunction with the accompanying drawings, which describe and illustrate various systems, sub-systems, devices, apparatus, models, processes, and methods of additional aspects.

BRIEF DESCRIPTION OF THE SEVERAL VIEWS OF THE DRAWINGS

The drawings referenced herein form a part of the specification, and are incorporated herein by reference. Features shown in the drawings are meant as illustrative of only some embodiments, and not of all embodiments, unless otherwise explicitly indicated.

DETAILED DESCRIPTION

It will be readily understood that the components of the exemplary embodiments, as generally described and illustrated in the Figures herein, may be arranged and designed in a wide variety of different configurations. Thus, the following detailed description of the embodiments of the system, the computer program product, and the method and other aspect described herein, as presented in this description and the accompanying Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment. It should be understood that the various embodiments may be combined with one another and that embodiments may be used to modify one another.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Figure 1:
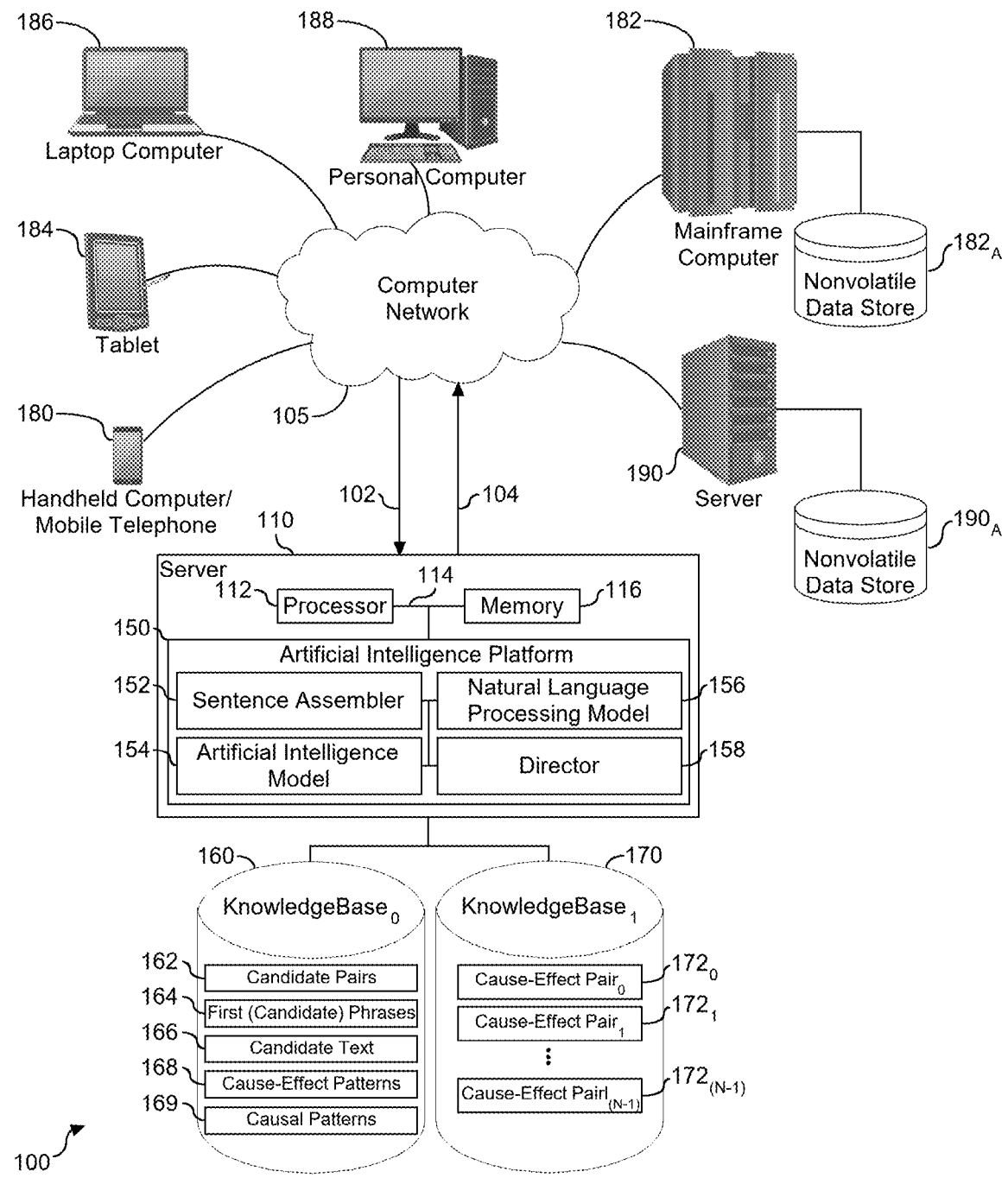
FIG. 1 illustrates a schematic diagram of a computer system to support and enable identification and verification of causal pairs, as well as creation and/or augmentation of a knowledge base.

Referring to FIG. 1, a schematic diagram of a platform computing system (100) is depicted. In an exemplary embodiment, the system (100) includes or incorporates an artificial intelligence (AI) platform (150). As shown, a server (110) is provided in communication with a plurality of computing devices (180), (182), (184), (186), (188), and (190) across a network connection (105). The server (110) is configured with a processing unit (also referred to herein as a processor) (112) in communication with memory (116) across a bus (114). The server (110) is shown with the AI platform (150) for cognitive computing, including natural language processing (NLP) and machine learning (ML), over the network (105) from one or more of the computing devices (180), (182), (184), (186), (188), and (190). More specifically, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable communication detection, recognition, and resolution. Other embodiments of the server (110) may be used with components, systems, sub-systems, and/or devices other than those that are depicted herein.

The AI platform (150) is shown herein configured with tools to distinguish causal relationships from non-causal relationships and populate a knowledge base with the causal relationships. The tools include, but are not limited to, a sentence assembler (152), an AI model (154), which in an exemplary embodiment comprises a machine learning model (MLM), a natural language processing (NLP) model (156), and a director (158). Although FIG. 1 shows each of the tools (152), (154), (156), and (158) as part of the AI platform (150), it should be understood that in an embodiment any one or combination of the tools (152), (154), (156), and (158) is/are not necessarily part of the AI platform (150) or AI operated. In exemplary embodiments, the sentence assembler (152) is non-AI, i.e., the sentence assembler (152) functions are carried out without the use of artificial intelligence. In exemplary embodiments, the AI platform (150) can operate unsupervised or substantially unsupervised.

Artificial Intelligence (AI) relates to the field of computer science directed at computers and computer behavior as related to humans. AI refers to the intelligence when machines, based on information, are able to make decisions, which maximizes the chance of success in a given topic. More specifically, AI is able to learn from a dataset to solve problems and provide relevant recommendations. For example, in the field of AI computer systems, natural language systems (such as the IBM Watson® artificially intelligent computer system or other natural language interrogatory answering systems) process natural language based on system-acquired knowledge. To process natural language, the system may be trained with data derived from a database or corpus of knowledge, but the resulting outcome can be incorrect or inaccurate for a variety of reasons.

Machine learning (ML), which is a subset of AI, utilizes algorithms to learn from data and create foresights based on this data. AI refers to the intelligence when machines, based on information, are able to make decisions, which maximizes the chance of success in a given topic. More specifically, AI is able to learn from a dataset to solve problems and provide relevant recommendations. Cognitive computing is a mixture of computer science and cognitive science. Cognitive computing utilizes self-teaching algorithms that use minimum data, visual recognition, and natural language processing to solve problems and optimize human processes.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based upon an express or inherent relationship within the structure. Adequate datasets are relied upon for building those structures.

The AI platform (150) is shown herein configured to receive input (102) from one or more sources. For example, the AI platform (150) may receive input (e.g., candidate pairs, candidate phrases, and/or candidate text) across the network (105) from one or more of the plurality of computing devices (180), (182), (184), (186), (188), and (190). Furthermore, and as shown herein, the AI platform (150) is operatively coupled to a first knowledge base, KnowledgeBase$_0$ (160), and a second knowledge base, KnowledgeBase$_1$ (170), each of which is also referred to herein as a corpus or a database. Although two knowledge bases (160) and (170) are shown in FIG. 1, it should be understood that variations of the system (100) may be employed. For example, KnowledgeBase$_0$ (160) and KnowledgeBase$_1$ (170) may be combined into a single knowledge base. According to another variation, either or both of KnowledgeBase$_0$ (160) and/or KnowledgeBase$_1$ (170) comprise a plurality of knowledge bases. According to still another variation, additional knowledges basis with other information are in communication with the AI platform (150).

According to exemplary embodiments, the AI platform (150) is configured to access candidate pairs of first and second phrases (162), candidate phrases (164), and/or candidate text (166) as input data for processing.

In exemplary embodiments, the first and second (candidate) phrases are noun phrases. In other exemplary embodiments, cause and effect phrases are not limited to noun phrases, but further comprise a prepositional phrase descriptive of the noun phrase. As a non-limiting example, consider the candidate text "There is a great concern about the effect of rising gasoline prices, due to supply shortages and cyberattacks." In the example sentence, the causal part of the sentence includes the noun phrase "great concern" followed by the descriptive prepositional phrase "about the effect of rising gasoline prices." In an exemplary embodiment, the NLP model (156) extracts the noun phrase and the descriptive prepositional phrase as either the cause or effect phrase. According to another embodiment, the first and second phrases of the candidate cause-effect pair are annotated with a tag identifying a class of semantic relationships between the first and second phrases. Examples of classes of semantic relationships include temporal, correlational, hypothetical, etc.

Candidate Pair Exemplary Embodiment(s)

In exemplary embodiments, the sentence assembler (152) of the AI platform (150) is configured to access one or more candidate pairs (162) and the candidate text (166) (typically a candidate sentence) containing the candidate pairs (162) from KnowledgeBase$_0$ (160), either directly from the KnowledgeBase$_0$ (160) or indirectly through one or more of the plurality of computing devices (180), (182), (184), (186), (188), and (190). Each candidate pair (162) comprises at least a first phase and a second phrase that represent a candidate cause-effect semantic pairing. In another exemplary embodiment, the NLP model (156) is configured to access and receive candidate text (166) from KnowledgeBase$_0$ (160), and to parse the candidate text (166) to identify candidate pairs therein.

The sentence assembler (152), which is shown in FIG. 1 as part of the AI platform (150) but in an alternative exemplary embodiment is not AI-based or part of the AI platform (150), is configured to access a plurality of cause-effect patterns (168). In an exemplary embodiment, the cause-effect patterns (168) are syntactically different from one another. Examples of cause-effect patterns (168) include "X causes Y," "X is the reason for Y," "Because of X, Y," "X leads to Y," "if X, then Y," "the Effect of X is Y," "Y is a result of X," etc. In an exemplary embodiment, the sentence assembler (152) is configured to generate a plurality of variant sentences by substituting or plugging in the first and second phrases of each of the candidate pairs (162) into the different cause-effect patterns (168).

In an embodiment, the AI model (e.g., MLM) (154) is configured to receive the variant sentences from the sentence assembler (152). In an exemplary embodiment, the AI model (154) is an inference model, such as a natural language inference (NLI) model. The AI model (154) is configured determine, for each of the variant sentences, a respective probability that the variant sentence is inferred from the candidate text, e.g., the candidate sentence. According to an exemplary embodiment, the probability may be represented as a score, such as a confidence score between zero and one. For example, for a variant sentence "a summer of violent storms throughout the southeast led to a rise in the number of property insurance claims," the AI model (154) assesses the probability that the variant sentence is inferred by the candidate text.

According to an embodiment, the AI model (e.g., MLM) is trained using training data designed for the task. For example, in an embodiment the natural language inference (NLI) model is trained using training data curated by humans (e.g., subject matter experts), wherein the training data includes pairs of sentences marked with labels such as, by way of example, "entails", "contradicts", or "neutral". As a non-limiting example of a training instance, a first sentence provided may read "We observed a major decrease in prices after a statement was made," with "statement being the first phrase and "major decrease in prices" being the second phrase. A second sentence is constructed using one of the cause-effect patterns, such as "a statement caused a major decrease in prices" to evaluate if the input sentence entails, contradicts, or is neutral with respect to the second sentence.

In exemplary embodiments, the AI model (154) is further configured to calculate a statistical measure, such as a mean or a median, of the respective probabilities of the variant sentences. An assessment is made whether the calculated statistical measure is indicative that the first and second phrases of the candidate pair possess a causal relationship or a non-causal relationship. In an embodiment, the assessment comprises determining whether the calculated statistical measure satisfies a predetermined threshold, such as, by way of example, a statistic measure of 0.5 or greater.

In an exemplary embodiment, the director (158) is in communication with the KnowledgeBase$_1$ (170), which in FIG. 1 is depicted pre-populated with a plurality of verified cause-effect pairs, e.g., Cause-Effect Pair$_0$ (172$_0$), Cause-Effect Pair$_1$ (172$_1$), and Cause-Effect Pair$_{N-1}$ (172$_{N-1}$), wherein N can be any integer. In an exemplary embodiment, the director (158) is configured to further populate the KnowledgeBase$_1$ (170) with the candidate text and the candidate pair as a verified cause-effect pair if the candidate pair is verified to have a causal relationship. On the other hand, the director (158) is configured not to further populate the KnowledgeBase$_1$ (170) with the candidate pair if the candidate pair is assessed to have a non-causal relationship.

The verified candidate pairs have various applications and uses. In an exemplary embodiment, the candidate pairs verified to have a causal relationship can be used to train the AI model. In another embodiment, the candidate pairs verified to have a causal relationship can be used for forecasting (or predicting) future events. For example, if there are "protests" occurring tomorrow, and the AI model draws a causal relationship (or a lack of a causal relationship) between "protests" and "violence", the verified candidate pairs can be used to produce an alert, if appropriate.

Candidate Phrase Exemplary Embodiment(s)

In exemplary embodiments, the NLP model (156) is configured to access one or more first phrases (164) from KnowledgeBase$_0$ (160), either directly from the KnowledgeBase$_0$ (160) or indirectly through one or more of the plurality of computing devices (180), (182), (184), (186), (188), and (190). In an exemplary embodiment, each of the accessed first phrases (164) represents a cause phrase or an effect phrase of candidate text, e.g., a candidate sentence. In another exemplary embodiment, the NLP model (156) is configured to access candidate text (166) from KnowledgeBase$_0$ (160), and to parse the candidate text (166) to extract first phrases therefrom. In an exemplary embodiment, the NLP model (156) uses the accessed first phrases (164) to generate natural language (NL) questions derived from or comprising the accessed first phrases.

In an exemplary embodiment, the AI model (154) comprises a question-answer (QA) model. QA models can be trained in advance using, for example, question-answer pairs that have been reviewed by a SME. The AI model (154) (e.g., QA model) is configured to extract one or more candidate second phrases from the candidate text. According to an embodiment, the accessed first phrases (164) represent causes, and the candidate second phrase(s) represent an effect or effects. According to another embodiment, the accessed first phrases (164) represent effects, and the candidate second phrase(s) represent a cause or causes.

The AI model (154) is configured to determine, for each of the candidate second phrases, a respective probability whether the candidate second phrase correctly answers the NL question. According to an exemplary embodiment, the probability may be represented as a score, such as a confidence score between zero and one. In an embodiment, each score represents a measure of the likelihood that the accessed first phrase and the candidate second phrase possess a cause-effect relationship with respect to one another. At least one matched candidate pair is selected based on the probability or score. According to an exemplary embodiment, the probability (e.g., score) of the selected matched candidate pair reflects a greatest likelihood that the accessed first phrase and the candidate second phrase have the cause-effect relationship. For example, where scores are between zero and one, with zero being the lowest score and one being the highest score, the pair with the highest score (i.e., closest to one) is selected.

In an exemplary embodiment, the director (158) is in communication with the KnowledgeBase$_1$ (170), which in FIG. 1 is depicted pre-populated with a plurality of verified cause-effect pairs, e.g., Cause-Effect Pair$_0$ (172$_0$), Cause-Effect Pair$_1$ (172$_1$), and Cause-Effect Pair$_{N-1}$ (172$_{N-1}$), wherein N can be any integer. In an exemplary embodiment, the director (158) is configured to further populate the KnowledgeBase$_1$ (170) with the matched candidate pair having the highest score (or plurality of matched candidate pairs having the highest scores). On the other hand, the director (158) is configured not to further populate the KnowledgeBase$_1$ (170) with first and second phrases having a non-causal relationship.

The director (158) is in communication with the KnowledgeBase$_1$ (170) including one or more cause-effect phrase pairs, e.g., Cause-Effect Pair$_0$ (172$_0$), Cause-Effect Pair$_1$ (172$_1$), and Cause-Effect Pair$_N$ (172$_N$) in FIG. 1. The director (158) is configured to populate the KnowledgeBase$_1$ (170) with the matched candidate pair(s) having the highest score(s), thereby incrementally increasing the quantity of cause-effect pairs populating KnowledgeBase$_1$ (170).

The verified pairs have various applications and uses. In an exemplary embodiment, the candidate pairs verified to have a causal relationship can be used to train the AI model. In another embodiment, the candidate pairs verified to have a causal relationship can be used for forecasting (or predicting) future events, as described above.

Candidate Text (Without Candidate Pair/Phrase Seeds) Exemplary Embodiment(s)

According to other exemplary embodiments, the AI platform (150) accesses the candidate text (166). In exemplary embodiments, the AI platform (150) is configured to access the candidate text (166) from KnowledgeBase$_0$ (160), either directly from the KnowledgeBase$_0$ (160) or indirectly through one or more of the plurality of computing devices (180), (182), (184), (186), (188), and (190). According to an exemplary embodiment, the NLP model (156) is configured to extract candidate sentences comprising first and second phrases from the candidate text (166). According to another exemplary embodiment, the NLP model (156) is configured to extract candidate phrases and pair all combinations of causes with effects to form candidate cause-effect pairs. According to an exemplary embodiment, phrase extraction is performed with NPFST (or NP), which is an algorithm for extracting noun phrases from sentences using Finite State Transducers. According to another exemplary embodiment, phrase extraction is performed using CP.NPFST (or CP), which is based on constituency parse of sentences to extract all kinds of phrases, not just noun phrases. See Handler et al., "Bag of What? Simple Noun Phrase Extraction for Text Analysis, Proceedings of the First Workshop of NLP and Computational Social Science, 114-124 (2016).

In exemplary embodiments, the candidate text (166) comprises structured and/or unstructured data. For example, the candidate text (166) may include the sentence "Even though secondary school summer break was shortened, a lowering of gas prices lead to a rise in summer vacation travel." In an embodiment, the NLP model (156) identifies a first candidate pair ($P_1$) of the first and second phrases "secondary school summer break was shortened" and "rise in summer vacation travel," respectively, which is non-causal. The NLP model (156) also identifies a second candidate pair ($P_2$) of the first and second phrases "a lowering of gas prices" and "rise in summer vacation travel," respectively, which is causal.

In an exemplary embodiment, the NLP model (156) is provided access to a plurality of causal patterns (169). In an exemplary embodiment, the causal patterns (169) are syntactically different from one another. The cause-effect patterns (168) (described above in connection with the candidate pair exemplary embodiments) and the causal patterns (169) may be the same or different from one another, or may partially overlap, with some patterns shared by both sets (168) and (169) and other patterns contained in only set (168) or (169), but not the other.

A non-limiting example of patterns of causal construction is found in Dunietz et al., The BECauSE Corpus 2.0: Annotating Causality and Overlapping Relations, Proceedings of the 11$^{th}$ Linguistic Annotation Workshop, 95-104 (2017). Irrespective of the source, patterns of causal construction that are common and often weak indicators of causality (e.g., "Y by X") can be removed to generate the set of causal patterns (169). A non-exhaustive list of exemplary causal patterns are rest forth in the Table below:

TABLE

1. X causes Y
2. Y because X
3. X triggers Y
4. Y results from
5. attribute Y to X
6. X is responsible for Y
7. whenever X, Y
8. Y arises from X
9. X contributes to Y
10. following X, Y The NLP model (156) is configured to lemmatize each of the causal patterns (169) and the candidate sentences from the candidate text (166). According to an embodiment, lemmatizing comprises converting the verbs (e.g., "causes" and "caused" for number 1 in the Table above) of the causal patterns (169) and candidate sentences from the candidate text (166) to their root form (e.g., "cause"). As an example, lemmatization of the verb of the causal pattern "X causes Y" to its root form produces the lemmatized causal pattern "X cause Y." The lemmatizing of the verb facilitates matching of the causal patterns and candidate sentences.

The NLP model (156) is further configured to convert the lemmatized causal patterns to lemmatized regexes, e.g., "(.*) cause (.*)." The lemmatized regexes are compared to the lemmatized candidate sentences (166) to find one or more matches. In an exemplary embodiment, matching comprises identifying regexes and candidate sentences having the same root verb, e.g., "cause," "trigger," "result," "attribute," etc. In an exemplary embodiment, the matched lemmatized candidate sentences are subject to verification, e.g., that the above-described first candidate pair $P_1$ is non-causal, and the above-described second candidate pair $P_2$ is causal. According to an exemplary embodiment, verification comprises adding the first and second phrases of the matched lemmatized candidate sentences to the candidate pairs (162), and processing the candidate pairs as described above in connection with the candidate pair exemplary embodiment.

While the above description refers to the NLP model (156) performing multiple tasks in certain exemplary embodiments, it should be understood that the NLP model (156) may comprise a plurality of NLP models, each assigned a specific task or tasks, with the plurality of NLP models collectively referred to as the NLP model (156).

In some illustrative embodiments, the server (110) may be the IBM Watson® system available from International Business Machines Corporation of Armonk, New York, which is augmented with the mechanisms of the illustrative embodiments described hereafter. The sentence assembler (152), the AI model (154), the NLP model (156), and the director (158), referred to collectively as tools, are shown as being embodied in or integrated within the AI platform (150) of the server (110). In an embodiment, the tools may be implemented in a separate computing system (e.g., server 190) that is connected across network (105) to the server (110). Wherever embodied, the tools function to support identifying cause-effect pairs and building the knowledge base of cause-effect pairs.

Types of information handling systems that can utilize the AI platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store ($190_A$), and mainframe computer (182) utilizes nonvolatile data store (182a). The nonvolatile data store ($182_A$) can be a component that is external to the various information handling systems or can be internal to one of the information handling systems.

The information handling system employed to support the AI platform (150) may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, the information handling system may embody the north bridge/south bridge controller architecture, although it will be appreciated that other architectures may also be employed.

Figure 2:
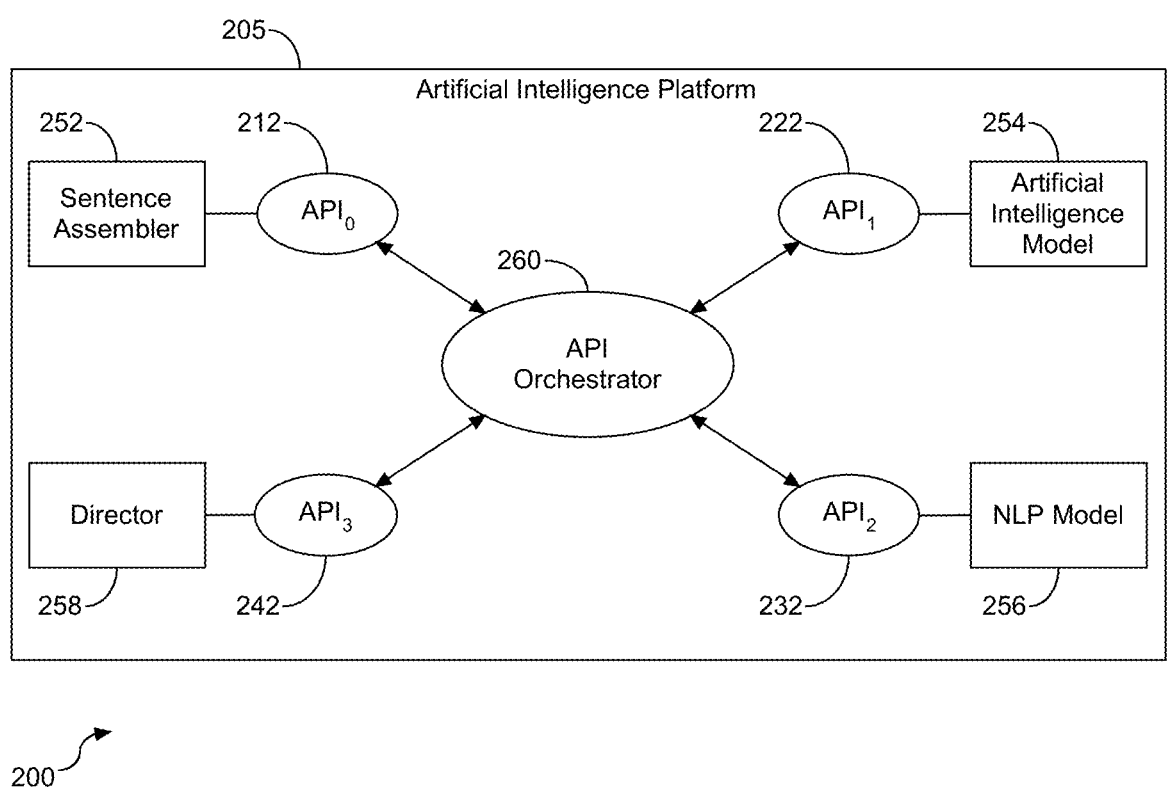
FIG. 2 illustrates a block diagram depicting the AI platform tools, as shown and described in FIG. 1, and their associated application program interfaces (APIs).

An Application Program Interface (API) is understood in the art as a software intermediary between two or more applications. With respect to the (AI) platform (150) shown and described in FIG. 1, one or more APIs may be utilized to support one or more of the tools (152), (154), (156), and (158) and their associated functionalities. Referring to FIG. 2, a block diagram (200) is provided illustrating the tools (152), (154), (156), and (158) and their associated APIs. As shown, a plurality of tools are embedded within the (AI) platform (205), with the tools including a sentence assembler (252) associated with $API_0$ (212), an artificial intelligence model (e.g., machine learning model) (254) associated with $API_1$ (222), a natural language processing model (256) associated with $API_2$ (232), and a director (258) associated with $API_3$ (242). Each of the APIs may be implemented in one or more languages and interface specifications.

As shown, $API_0$ (212) is configured to support and enable the functionality represented by the sentence assembler (252). $API_0$ (212) provides functional support to assemble sentences from first and second phrases using cause-effect patterns; $API_1$ (222) provides functional support to extract candidate sentences from a corpus, lemmatize sentences and causal patterns, generate regexes, and generate natural language questions; $API_2$ (232) provides functional support to draw inferences, generate question-answer pairs, and provide statistical measures and scores; and $API_3$ (242) provides functional support to populate knowledge bases with cause-effect phrase pairs. As shown, each of the APIs (212), (222), (232), and (242) are operatively coupled to an API orchestrator (260), otherwise known as an orchestration layer, which is understood in the art to function as an abstraction layer to transparently thread together the separate APIs. In an embodiment, the functionality of the separate APIs may be joined or combined. In another embodiment, the functionality of the separate APIs may be further divided into additional APIs. As such, the configuration of the APIs shown herein should not be considered limiting. Accordingly, as shown herein, the functionality of the tools may be embodied or supported by their respective APIs.

Figure 3A:
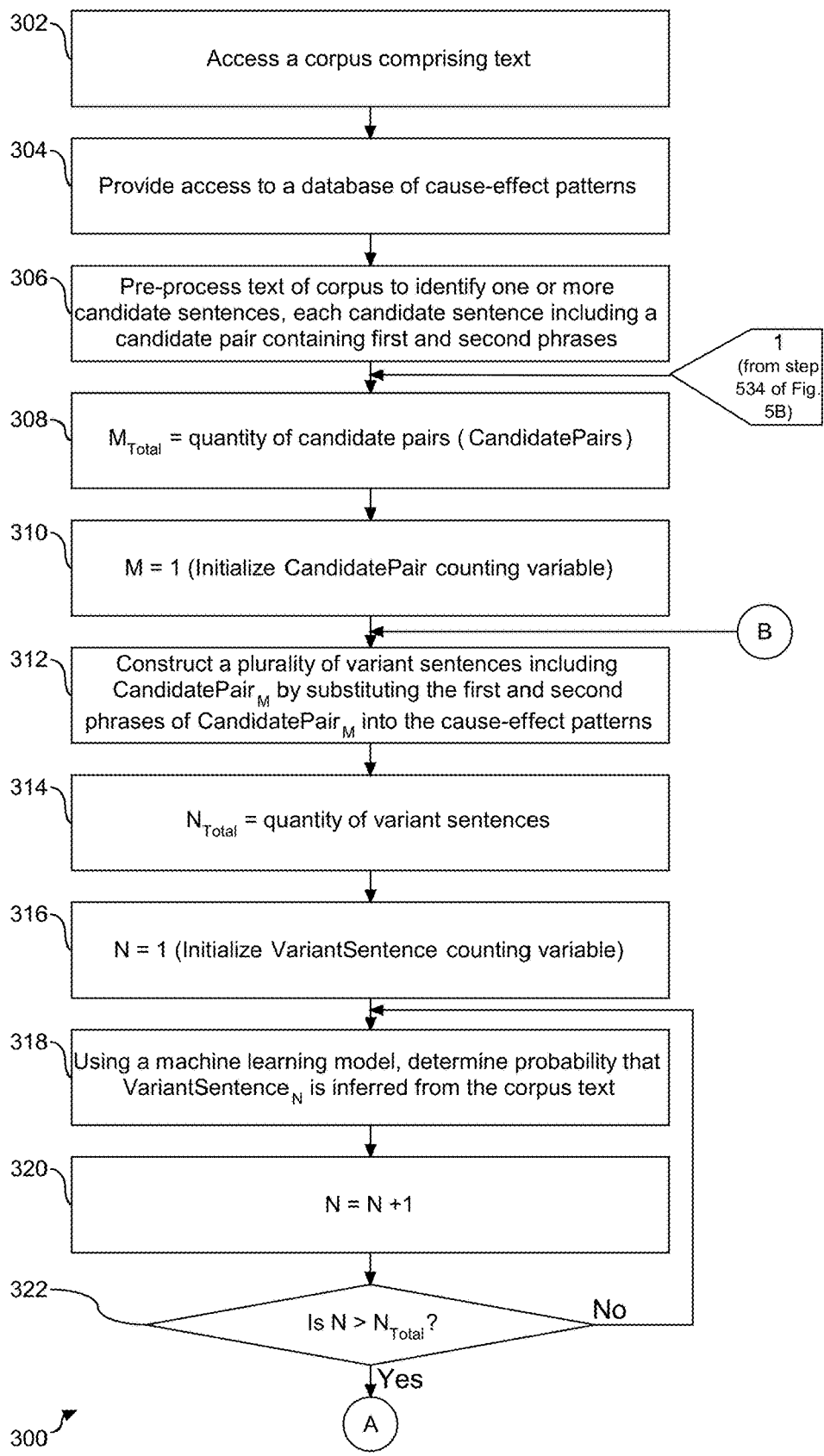
FIGS. 3A and 3B collectively illustrate a flow chart for ascertaining whether candidate phrase pairs possess a causal relationship or non-causal relationship according to an exemplary embodiment.
Figure 3B:
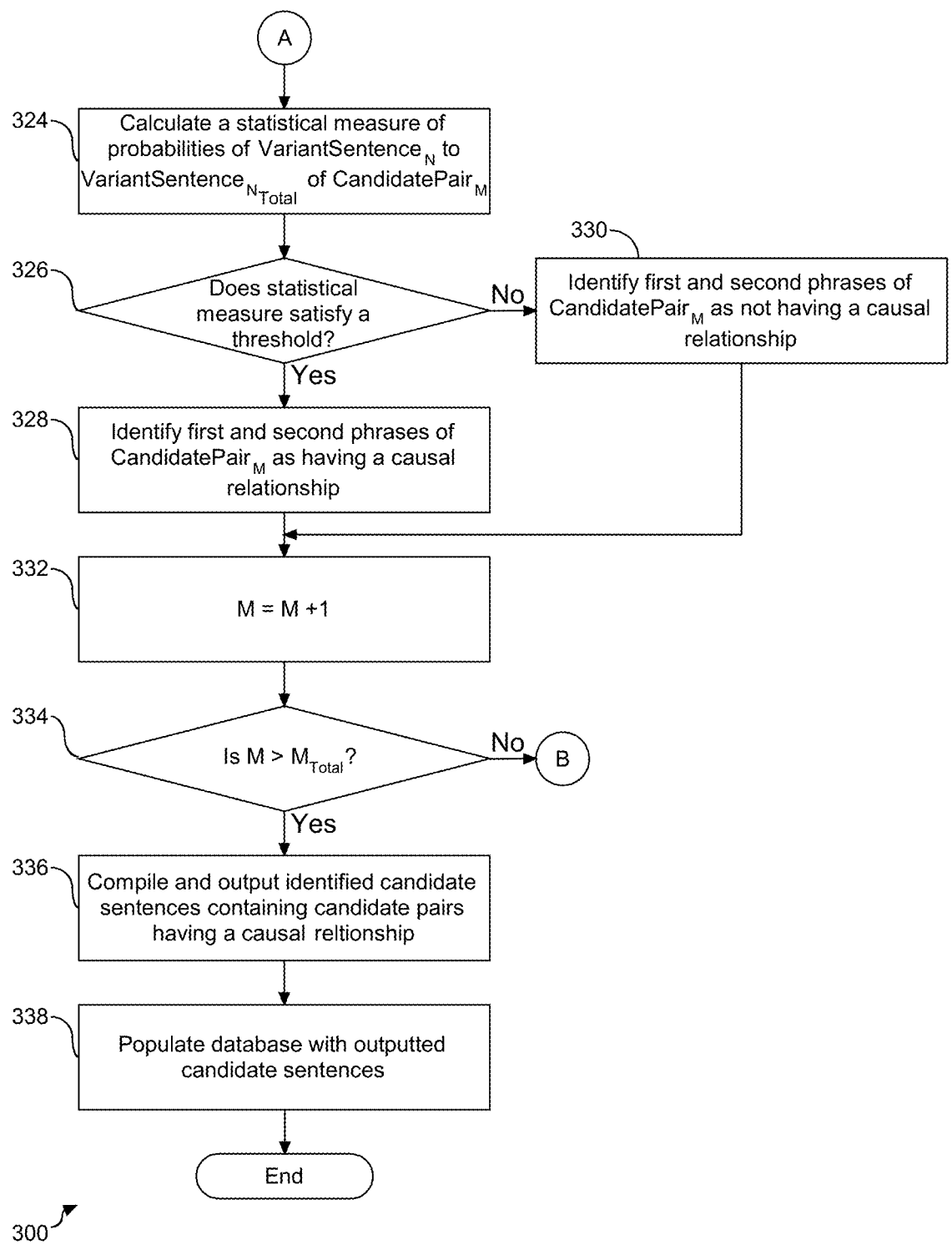

Referring collectively to FIGS. 3A and 3B, a flow chart (300) is provided illustrating an embodiment of a process (or method) for ascertaining whether candidate phrase pairs possess a causal relationship or non-causal relationship.

In FIG. 3A, a corpus comprising text is accessed (302), and a database of cause-effect patterns is accessed (304). In an exemplary embodiment, the cause-effect patterns are syntactically different from one another. The text of the accessed corpus is pre-processed to identify one or more candidate sentences, each of which includes a candidate pair containing first and second phrases (306). The quantity of candidate pairs is identified and assigned the variable $M_{TOTAL}$ (308), and a corresponding CandidatePair counting variable, M, is initialized (310).

Variant sentences are constructed from the CandidatePair$_M$ by substituting the first and second phrases of the CandidatePair$_M$ into each of the accessed cause-effect patterns (312). The quantity of variant sentences is identified and assigned the variable $N_{TOTAL}$ (314), and a corresponding VariantSentence counting variable, N, is initialized (316). Using an AI model, e.g., a machine learning model (MLM), such as a natural language inference model, the probability that VariantSentence$_N$ is inferred from the corpus text, e.g., a sentence, is determined (318). The VariantSentence counting variable, N, is incremented (320), and a decision is made whether the incremented variable N is greater than $N_{TOTAL}$ (322). A non-affirmative response to the decision (322) is interpreted as an indication that additional variant sentences remain for processing, which causes a return to step (318) for processing of the next variant sentence. An affirmative response to the decision (322) is interpreted as an indication that all variant sentences for the CandidatePair$_M$ have been processed.

Referring to FIG. 3B, the affirmative response to the decision (322) causes a calculation of a statistical measure of probabilities of VariantSentence$_1$ to VariantSentence$_{NTOTAL}$ for CandidatePair$_M$ (324), shown in FIG. 3B. Examples of statistical measures include means and medians. A decision is made whether the statistical measure satisfies a threshold (326). An affirmative response to the decision (326) is interpreted as an indication that a causal relationship exists between the first and second phrases of the candidate pair, and the first and second phrases of the CandidatePair$_M$ are identified as having a causal relationship (328). In the event of a non-affirmative response to the decision (326), the first and second phrases of the CandidatePair$_M$ are identified as not having a causal relationship (330). In either case, following either step (328) or (330), or a non-affirmative response from the decision at step (326), the CandidatePair counting variable, M, is incremented (332), and a decision is made whether the incremented counting variable M is greater than $M_{TOTAL}$ (334). A non-affirmative response to the decision (334) is interpreted as an indication that additional candidate pairs remain for processing, which causes a return to step (312). An affirmative response to the decision (334) is interpreted as an indication that all candidate pairs have been processed, which causes the process to proceed to (336). At (336), the identified candidate sentences containing candidate pairs having a causal relationship are compiled and outputted. The outputted candidate sentences are used to populate a database (338), e.g., KnowledgeBase$_1$ (170) of FIG. 1.

Figure 4A:
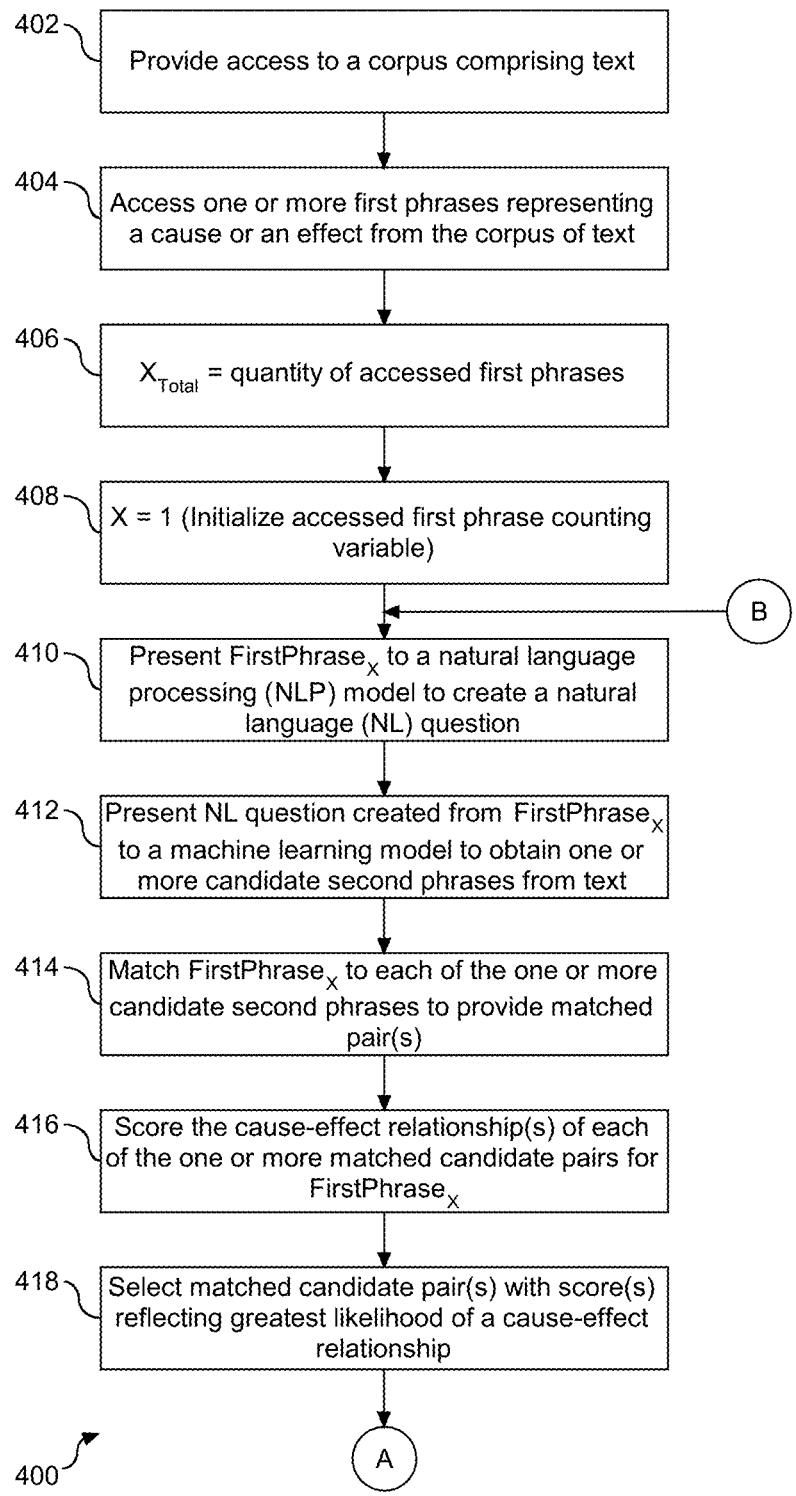
FIGS. 4A and 4B collectively illustrate a flow chart for matching a candidate cause or effect phrase with a corresponding effect or cause, respectively.
Figure 4B:
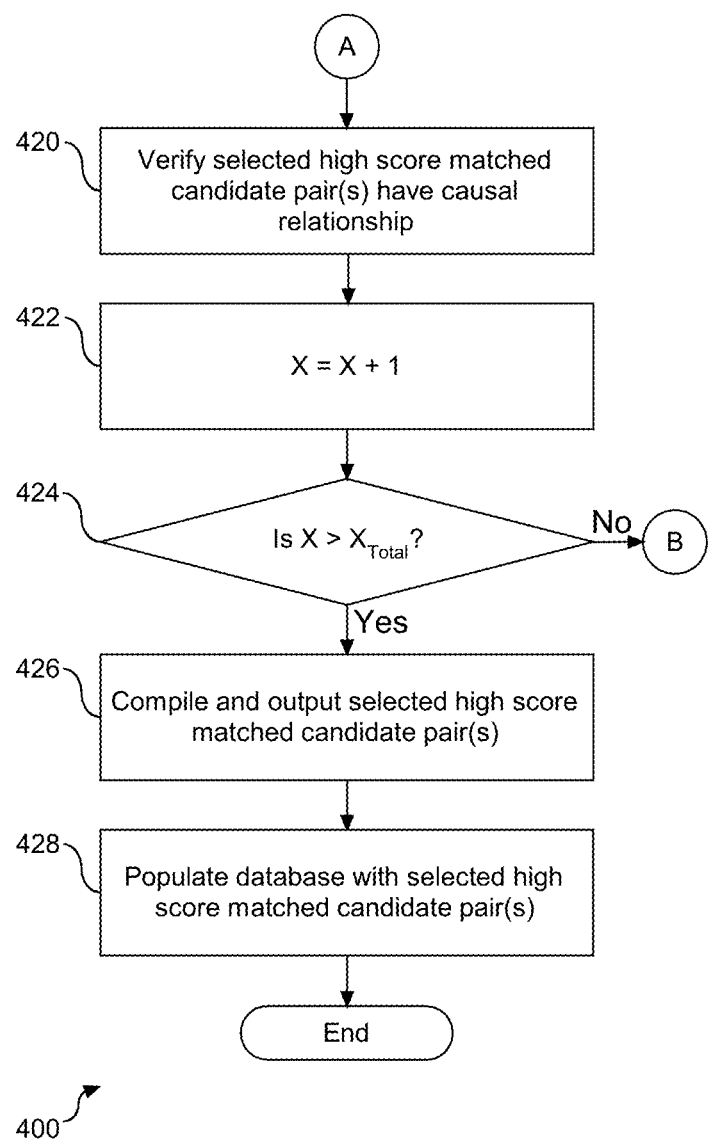

Referring collectively to FIGS. 4A and 4B, a flow chart (400) is provided illustrating an embodiment of a process (or method) for starting with text (e.g., one or more sentences) and a candidate cause phrase or effect phrase and identifying a corresponding effect phrase or cause phrase, respectively.

In FIG. 4A, a corpus comprising text is accessed (402). One or more first phrases representing a cause or an effect are also accessed (404). The quantity of accessed first phrases is identified and assigned the variable $X_{TOTAL}$ (406), and a corresponding FirstPhrase counting variable, X, is initialized (408).

FirstPhrase$_X$ is presented to a natural language processing (NLP) model to create a natural language (NL) question (410). The NL question is presented to an AI model, e.g., a machine learning model (MLM), such as a question-answer (QA) model, to extract one or more candidate second phrases from the corpus text (412). The FirstPhase$_X$ is matched to each of the one or more candidate second phrases to provide matched candidate pair(s) (414). Each of the matched candidate pairs is assigned a cause-effect relationship score (416). In an exemplary embodiment, the AI model assigns the score. The matched candidate pair(s) with a score/scores reflecting a greatest likelihood that the FirstPhrase$_X$ and the candidate second phrase has a cause-effect relationship is/are selected (418).

Referring to FIG. 4B, verification is performed that the selected high score matched candidate pair(s) have a causal relationship (420). According to an embodiment, the verification (420) may involve analyzing the selected high score matched candidate pair(s) by subjecting the candidate pair(s) to steps (308) to (336) of FIG. 3A. The FirstPhrase counting variable, X, is incremented (422), and a decision is made whether the incremented value of FirstPhrase$_X$ is greater than $X_{TOTAL}$ (424). A non-affirmative response to the decision (424) is interpreted as an indication that additional accessed first phrases remain for processing, which causes a return to step (410). An affirmative response to the decision (424) is interpreted as an indication that all of the accessed first phrases have been processed. The selected high score matched pairs are compiled and output (426), and used to populate a database (428).

Figure 5A:
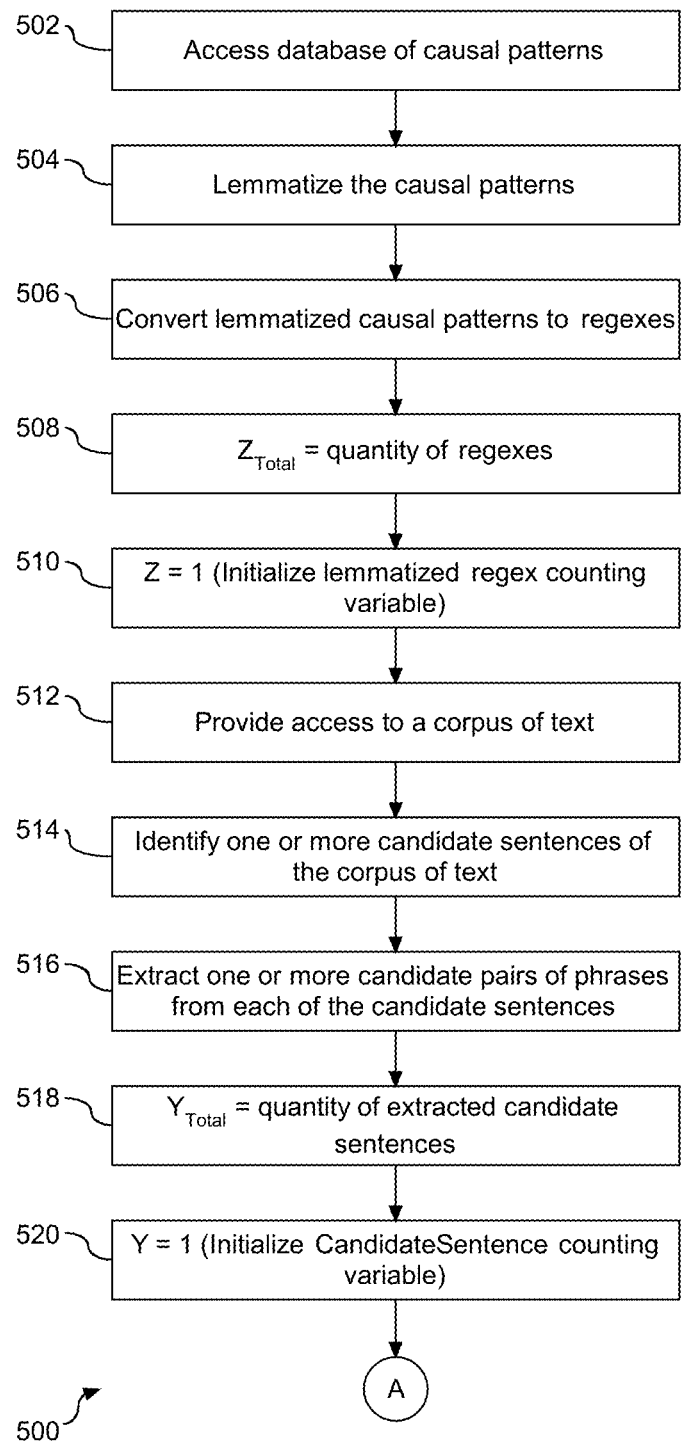
FIGS. 5A and 5B collectively illustrate a flow chart for determining whether candidate sentences extracted from a corpus of text includes a causal relationship.
Figure 5B:
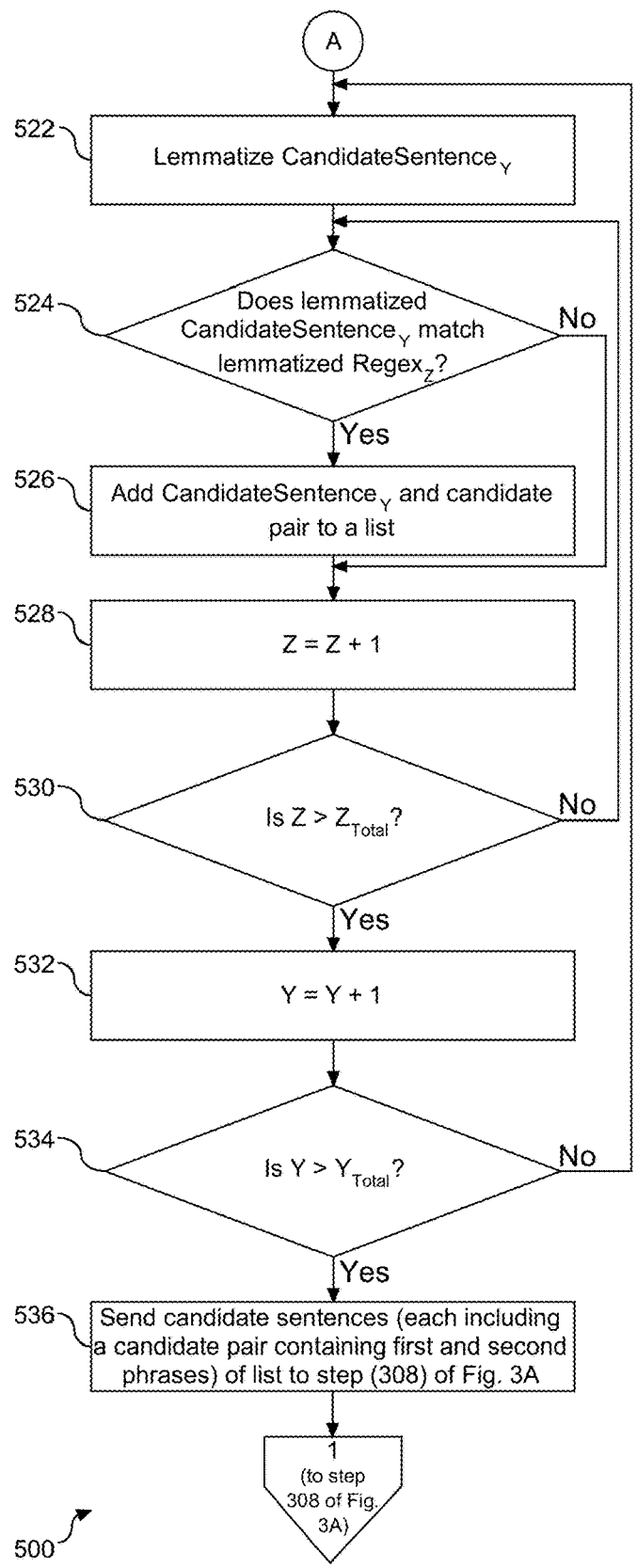

Referring collectively to FIGS. 5A and 5B, a flow chart (500) is provided illustrating an embodiment of a process (or method) for determining whether candidate sentences accessed from a corpus comprising text possess a cause-effect relationship.

In FIG. 5A, a database of causal patterns (e.g., causal patterns (169) of FIG. 1 described above) is accessed (502). In an exemplary embodiment, the causal patterns are syntactically different from one another. The causal patterns are lemmatized (504). In an exemplary embodiment, the verb of the causal patterns is lemmatized. For example, the verb "causes" of the causal patterns "X causes Y" and the verb "caused" of the causal pattern "X caused Y" are converted to the root verb, "cause." In an exemplary embodiment, a NLP model is used for the lemmatization. The lemmatized causal phrase (e.g., X cause Y) is converted to a regex (e.g., "(.*) cause (.*)") (506). A quantity of the regexes is identified and assigned the variable $Z_{TOTAL}$ (508), and a lemmatized regex counting variable, Z, is initialized (510).

A corpus comprising text is accessed (512). One or more candidate sentences of from the corpus of text are identified (514). For each sentence, one or more candidate pairs of first and second phrases are extracted (516). In an exemplary embodiment, the first and second phrases comprise noun phrases. In another exemplary embodiment, either or both of the first and second phrases comprise a noun phrase and a descriptive prepositional phrase. In other embodiments, either or both of the first and second phrases are not noun phrase(s). A quantity of the candidate sentences is identified and assigned the variable $Y_{TOTAL}$ (518). A counting variable, Y, is initialized for CandidateSentences (520).

The CandidateSentence$_Y$ is also lemmatized (522). As shown in FIG. 5B, a decision is made whether the one or more pairs of first and second phrases of the lemmatized CandidateSentence$_Y$ match the lemmatized Regex (524). In an exemplary embodiment, the decision (524) comprises assessing whether each pair of the first and second phrases of the lemmatized CandidateSentence$_Y$ has the same lemmatized verb as the lemmatized Regex$_Z$. An affirmative answer to the decision (524) is interpreted as an indication that the pair of the first and second phrases of the candidate sentence potentially possesses a causal relationship. If the decision (524) is answered in the affirmative, the CandidateSentence$_Y$ and the candidate pair of phrases are added to a list (526), which in an embodiment is a file, and the Regex counting variable Z is incremented (628). On the other hand, answering the decision (524) in the non-affirmative causes the process to proceed to step (528) to increment the Regex counting variable Z.

After the Regex counting variable Z is incremented (528), a decision is made whether the incremented Regex counting variable Z is greater than $Z_{TOTAL}$ (530). A non-affirmative answer to the decision (530) is interpreted as an indication that the CandidateSentence$_Y$ has not been subjected to a matching decision with respect to all of the lemmatized regexes, causing the process to return to decision (524) for determining whether a match exists between the CandidateSentence$_Y$ and the incremented regex, e.g. Regex$_Z$. An affirmative answer to the decision (530) is interpreted as an indication that all regexes have been subject to the matching process with respect to the CandidateSentence$_Y$, causing the candidate sentence variable to be incremented (532).

A decision is made whether the incremented variable Y is greater than $Y_{TOTAL}$ (534). A non-affirmative answer to the decision (534) is interpreted as an indication that not all of the lemmatized candidate sentences have been processed, causing the process to return to step (522) for lemmatizing of the incremented CandidateSentence$_Y$. An affirmative answer to the decision (534) is interpreted as an indication that all lemmatized candidate sentences have been processed (i.e., all lemmatized candidate sentences have been subjected to the matching decision (524) with respect to all of the lemmatized regexes). Optionally list of candidate sentences with identified candidate pairs developed in step (526) is sent to step (308) of FIG. 3A for verification that the first and second phrases of the candidate sentences possess a cause-effect relationship (536).

Certain exemplary embodiments of the systems, methods, and computer program products described herein produce high quality collections of cause-effect pairs in an automated, substantially or entirely unsupervised manner. Exemplary embodiments further involve the use of the cause-effect pairs for further processing, representation as a causal knowledge graph, and use for decision support or predictive analysis.

Aspects of identifying and verifying causal pairs are shown and described with the tools and APIs shown in FIGS. 1 and 2, respectively, and the processes shown in FIGS. 3A, 3B, 4A, 4B, 5A, and 5B. Aspects of the functional tools (152), (154), (156), and (158) and their associated functionality may be embodied in a computer system/server in a single location, or in an embodiment, may be configured in a cloud-based system sharing computing resources. With references to FIG. 6, a block diagram (600) is provided illustrating an example of a computer system/server (602), hereinafter referred to as a host (602) in communication with a cloud-based support system, to implement the processes described above with respect to FIGS. 3A-5B. The host (602) is operational with numerous other general purpose or special purpose computing system environments or configurations. Examples of well-known computing systems, environments, and/or configurations that may be suitable for use with the host (602) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

The host (602) may be described in the general context of computer system-executable instructions, such as program modules, being executed by a computer system. Generally, program modules may include routines, programs, objects, components, logic, data structures, and so on that perform particular tasks or implement particular abstract data types. Host (602) may be practiced in distributed cloud computing environments (610) where tasks are performed by remote processing devices that are linked through a communications network. In a distributed cloud computing environment, program modules may be located in both local and remote computer system storage media including memory storage devices.

Figure 6:
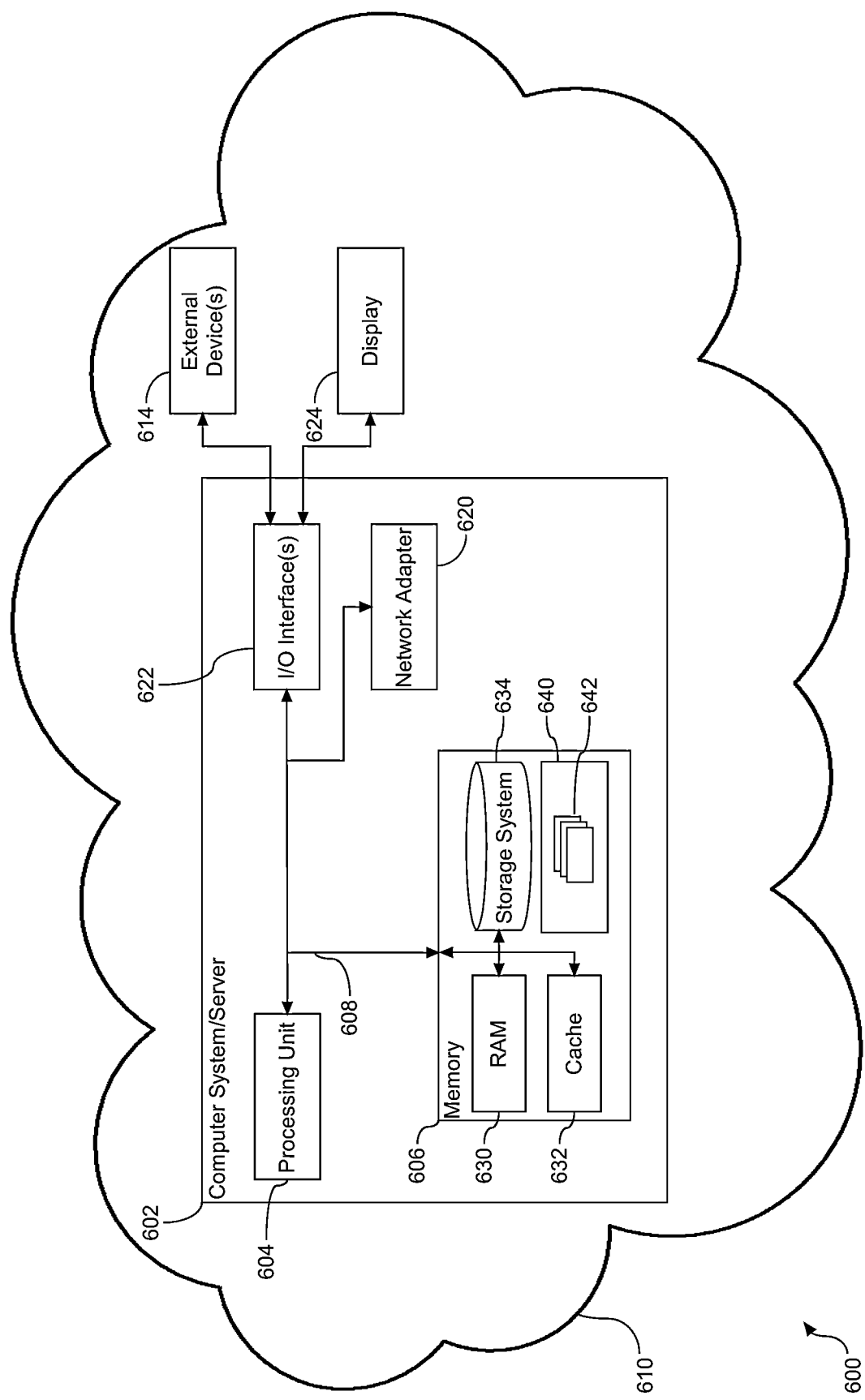
FIG. 6 illustrates a block diagram depicting an example of a computer system/server of a cloud based support system, to implement the system and processes described above with respect to FIGS. 1-5B.

As shown in FIG. 6, the host (602) is shown in the form of a general-purpose computing device. The components of the host (602) may include, but are not limited to, one or more processors or processing units (604), e.g. hardware processors, a system memory (606), and a bus (608) that couples various system components including the system memory (606) to the processing unit (604). A bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The host (602) typically includes a variety of computer system readable media. Such media may be any available media that is accessible by the host (602) and it includes both volatile and non-volatile media, removable and non-removable media.

The system memory (606) can include computer system readable media in the form of volatile memory, such as random access memory (RAM) (630) and/or cache memory (632). By way of example only, a storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus (608) by one or more data media interfaces.

A program/utility (640), having a set (at least one) of program modules (642), may be stored in the system memory (606) by way of example, and not limitation, as well as an operating system, one or more application programs, other program modules, and program data. Each of the operating systems, one or more application programs, other program modules, and program data or some combination thereof, may include an implementation of a networking environment. The program modules (642) generally carry out the functions and/or methodologies of embodiments to support and enable reinforcement learning through random action replay for natural language (NL). For example, the set of the program modules (642) may include the tools (152), (154), (156), and/or (158) as described in FIG. 1.

The host (602) may also communicate with one or more external devices (614), such as a keyboard, a pointing device, etc.; a display (624); one or more devices that enable a user to interact with the host (602); and/or any devices (e.g., network card, modem, etc.) that enable the host (602) to communicate with one or more other computing devices. Such communication can occur via Input/Output (I/O) interface(s) (622). Still yet, the host (602) can communicate with one or more networks such as a local area network (LAN), a general wide area network (WAN), and/or a public network (e.g., the Internet) via a network adapter (620). As depicted, the network adapter (620) communicates with the other components of the host (602) via the bus (608). In an embodiment, a plurality of nodes of a distributed file system (not shown) is in communication with the host (602) via the I/O interface (622) or via the network adapter (620). It should be understood that although not shown, other hardware and/or software components could be used in conjunction with the host (602). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as the system memory (606), including the RAM (630), the cache (632), and the storage system (634), such as a removable storage drive and a hard disk installed in a hard disk drive.

Computer programs (also called computer control logic) are stored in the system memory (606). Computer programs may also be received via a communication interface, such as the network adapter (620). Such computer programs, when run, enable the computer system to perform the features of the present embodiments as discussed herein. In particular, the computer programs, when run, enable the processing unit (604) to perform the features of the computer system. Accordingly, such computer programs represent controllers of the computer system.

In an embodiment, the host (602) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
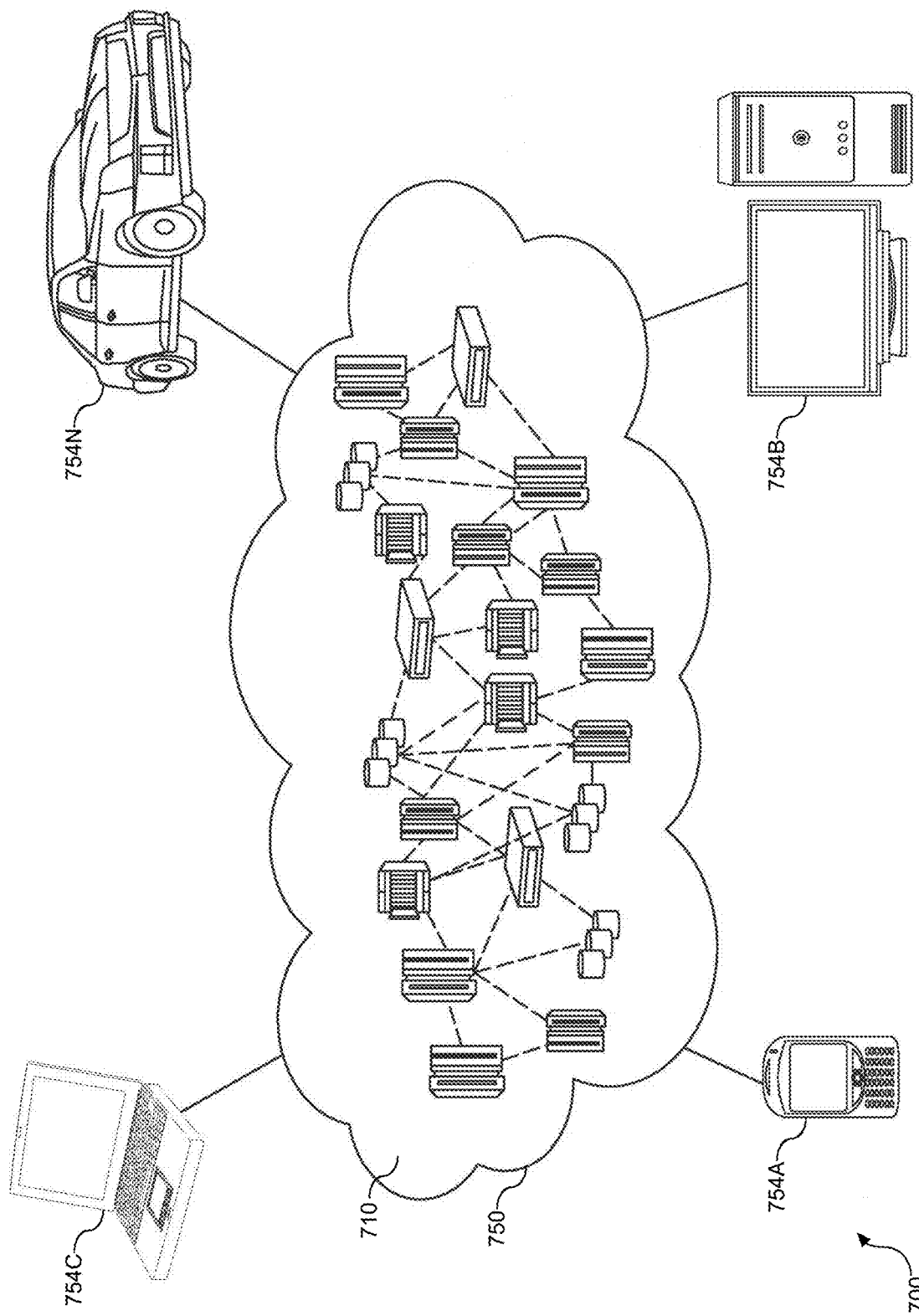
FIG. 7 illustrates a block diagram depicting a cloud computer environment.

Referring now to FIG. 7, an illustrative cloud computing network (700) is shown. The cloud computing network (700) includes a cloud computing environment (750) having one or more cloud computing nodes (710) with which local computing devices used by cloud consumers may communicate. Examples of these local computing devices include, but are not limited to, a personal digital assistant (PDA) or a cellular telephone (754A), a desktop computer (754B), a laptop computer (754C), and/or automobile computer system (754N). Individual nodes within the cloud computing nodes (710) may further communicate with one another. They may be grouped (not shown) physically or virtually, in one or more networks, such as Private, Community, Public, or Hybrid clouds as described hereinabove, or a combination thereof. This allows the cloud computing environment (700) to offer infrastructure, platforms and/or software as services for which a cloud consumer does not need to maintain resources on a local computing device. It is understood that the types of computing devices (754A-N) shown in FIG. 7 are intended to be illustrative only and that the cloud computing environment (750) can communicate with any type of computerized device over any type of network and/or network addressable connection (e.g., using a web browser).

Figure 8:
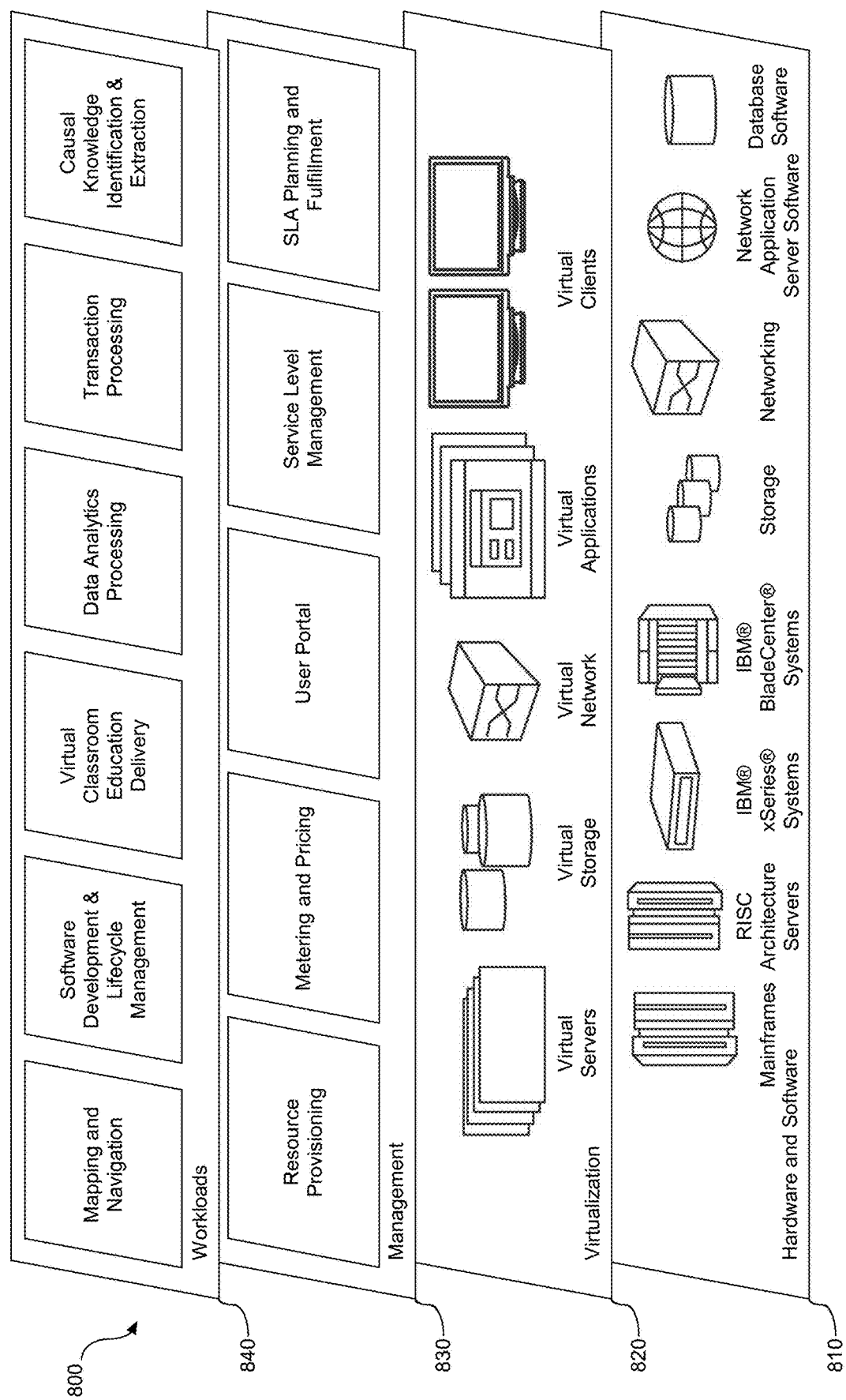
FIG. 8 illustrates a block diagram depicting a set of functional abstraction model layers provided by the cloud computing environment.

Referring now to FIG. 8, a set of functional abstraction layers (800) provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: a hardware and software layer (810), a virtualization layer (820), a management layer (830), and a workload layer (840).

The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

The virtualization layer (820) provides an abstraction layer from which the following examples of virtual entities may be provided: virtual servers; virtual storage; virtual networks, including virtual private networks; virtual applications and operating systems; and virtual clients.

In one example, the management layer (830) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

The workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and causal knowledge identification and extraction.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles. As used herein, the term "and/or" means either or both (or any combination or all of the terms or expressed referred to), e.g., "A, B, and/or C" encompasses A alone, B alone, C alone, A and B, A and C, B and C, and A, B, and C.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product are operative to provide improvements to identifying and verifying causal pairs.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Additional blocks not represented in the Figures may be included, for example, prior to, subsequent to, or concurrently with one or more illustrated blocks. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, identifying and verifying causal pairs may be carried out by different computing platforms or across multiple devices. Furthermore, the data storage and/or corpus may be localized, remote, or spread across multiple systems. Accordingly, the scope of protection of the embodiments is limited only by the following claims and their equivalents.

What is claimed is:

1. A computer system comprising:
a computer processor operatively coupled to memory;
a sentence assembler operatively associated with the computer processor to:
  access candidate text and a candidate pair of first and second phrases; and
  substitute the first and second phrases into a plurality of cause-effect patterns to generate a plurality of variant sentences including the first and second phrases; and
an artificial intelligence (AI) platform in communication with the computer processor and the memory, the AI platform comprising:
  an AI model configured to:
    determine respective probabilities that the variant sentences are inferred from the candidate text;
    calculate a statistical measure of the respective probabilities; and
    assess the calculated statistical measure to ascertain whether the first and second phrases possess a causal relationship or non-causal relationship to one another; and
  a director configured to populate a knowledge base with the candidate text including the first and second phrases possessing the causal relationship.

2. The computer system of claim 1, wherein the AI model comprises an inference model.

3. The computer system of claim 1, further comprising:
a natural language processing (NLP) model in communication with a corpus comprising the candidate text, the NLP model configured to extract the candidate pair from the corpus.

4. The computer system of claim 3, wherein the NLP model is further configured to:
lemmatize a plurality of causal patterns;
convert the lemmatized causal patterns to regexes;
lemmatize the candidate text;
determine whether the lemmatized candidate text matches one or more of the regexes; and
identify the candidate pair from the lemmatized candidate text and the matched one or more of the regexes.

5. The computer system of claim 3, wherein the NLP model is configured to:
extract a noun phrase and a prepositional phrase descriptive of the noun phrase from the corpus, the noun and preposition phrases collectively representing the first phrase or the second phrase.

6. The computer system of claim 1, wherein the director is configured to train the AI model with the candidate text including the first and second phrases possessing the causal relationship.

7. A computer system comprising:
a computer processor operatively coupled to memory; and
an artificial intelligence (AI) platform in communication with the computer processor and the memory, the AI platform comprising:
  a natural language processing (NLP) model configured to:
    generate a natural language (NL) question using a first phrase representing a cause or an effect;
  a first AI model configured to:
    extract one or more candidate second phrases from candidate text;
    determine respective probabilities that the one or more candidate second phrases answer the NL question; and
    select the candidate second phrase having the highest probability as possessing a causal relationship with the first phrase; and
  a director configured to populate a knowledge base with the first and selected second phrases.

8. The computer system of claim 7, wherein the first AI model comprises a question-answer (QA) model.

9. The computer system of claim 7, wherein:
the NLP model is in communication with a corpus comprising the candidate text, the NLP model being further configured to extract the first phrase from the corpus.

10. The computer system of claim 7, wherein the AI platform further comprises:
a sentence assembler configured to:
  access the first phrase and the selected second phrase; and
  substitute the first phrase and the selected second phrase into a plurality of cause-effect patterns to generate a plurality of variant sentences including the first and selected second phrases; and
a second AI model configured to:
  determine respective probabilities that the variant sentences are inferred from the candidate text;
  calculate a statistical measure of the respective probabilities; and
  assess the calculated statistical measure to ascertain whether the first and selected second phrases possess a causal relationship or non-causal relationship to one another.

11. The computer system of claim 7, wherein the director is configured to train the AI model with the first and selected second phrases.

12. A computer program product comprising:
a computer readable storage device; and
program code embodied with the computer readable storage device, the program code executable by the processor to:
  access candidate text;
  extract a candidate pair of first and second phrases from the candidate text;
  substitute the extracted first and second phrases into a plurality of cause-effect patterns to generate a plurality of variant sentences including the first and second phrases;
  determine respective probabilities that the variant sentences are inferred from the candidate text;
  calculate a statistical measure of the respective probabilities;
  assess the calculated statistical measure to ascertain whether the first and second phrases possess a causal relationship or non-causal relationship to one another; and
  populate a knowledge base with the candidate text including the first and second phrases possessing the causal relationship.

13. The computer program product of claim 12, further comprising program code executable by the processor to:
   extract the candidate pair from a corpus.

14. The computer program product of claim 13, further comprising program code executable by the processor to:
   lemmatize a plurality of causal patterns;
   convert the lemmatized causal patterns to regexes;
   lemmatize the candidate text;
   determine whether the lemmatized candidate text matches one or more of the regexes; and
   identify the candidate pair from the lemmatized candidate text and the matched one or more of the regexes.

15. The computer program product of claim 12, further comprising program code executable by the processor to:
   extract a noun phrase and a prepositional phrase descriptive of the noun phrase from the corpus, the noun and preposition phrases collectively representing the first phrase or the second phrase.

16. A computer-implemented method comprising:
   accessing candidate text and a candidate pair of first and second phrases;
   substituting the first and second phrases into a plurality of cause-effect patterns to generate a plurality of variant sentences including the first and second phrases;
   leveraging an AI model to:
      determine respective probabilities that the variant sentences are inferred from the candidate text;
      calculate a statistical measure of the respective probabilities; and
      assess the calculated statistical measure to ascertain whether the first and second phrases possess a causal relationship or non-causal relationship to one another; and
   populating a knowledge base with the candidate text including the first and second phrases possessing the causal relationship.

17. The computer-implemented method of claim 16, wherein the AI model comprises an inference model.

18. The computer-implemented method of claim 16, further comprising:
   extracting the candidate pair from a corpus, the corpus comprising the candidate text.

19. The computer-implemented method of claim 18, further comprising:
   lemmatizing a plurality of causal patterns;
   converting the lemmatized causal patterns to regexes;
   lemmatizing the candidate text;
   determining whether the lemmatized candidate text matches one or more of the regexes; and
   identifying the candidate pair from the lemmatized candidate text and the matched one or more of the regexes.

20. The computer-implemented method of claim 18, further comprising:
   extracting a noun phrase and a prepositional phrase descriptive of the noun phrase from the corpus, the noun and preposition phrases collectively representing the first phrase or the second phrase.

21. The computer-implemented method of claim 16, further comprising training the AI model using the candidate texts including the first and second phrases possessing the causal relationship.

22. A computer-implemented method comprising:
   generating a natural language (NL) question using a first phrase representing a cause or an effect;
   leveraging a first AI model, the leveraging of the first AI model comprising:
      extracting one or more candidate second phrases from candidate text;
      determining respective probabilities that the one or more candidate second phrases answer the NL question;
      selecting the candidate second phrase with the highest probability as possessing a causal relationship with the first phrase; and
   populating a knowledge base with the first and selected second phrases.

23. The computer-implemented method of claim 22, wherein the first AI model comprises a question-answer (QA) model.

24. The computer-implemented method of claim 22, further comprising training the AI model with the first and selected second phrases.

25. The computer-implemented method of claim 22, further comprising:
   substituting the first and selected second phrases into a plurality of cause-effect patterns to generate a plurality of variant sentences including the first and selected second phrases;
   leveraging a second AI model, the leveraging of the second AI model comprising:
      determining respective probabilities that the variant sentences are inferred from the candidate text;
      calculating a statistical measure of the respective probabilities; and
   assessing the calculated statistical measure to ascertain whether the first and selected second phrases possess a causal relationship or non-causal relationship to one another.

* * * * *